(12) United States Patent
Xu et al.

(10) Patent No.: US 6,412,062 B1
(45) Date of Patent: Jun. 25, 2002

(54) INJECTION CONTROL MECHANISM FOR EXTERNAL EVENTS

(75) Inventors: Yan Xu; Steven J. Tu, both of Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/343,972

(22) Filed: Jun. 30, 1999

(51) Int. Cl.[7] .............................. G06F 9/40; G06F 9/42; G06F 9/44; G06F 9/32; G06F 13/24
(52) U.S. Cl. ...................... 712/40; 712/23; 712/211; 712/219; 712/237; 712/238; 712/244; 712/245; 711/213; 714/50; 714/39; 710/267; 710/262; 710/266
(58) Field of Search .................. 712/211, 244, 712/233, 205, 42, 219, 37, 23, 34, 40, 248, 24, 228, 227, 226, 230, 245, 202, 217, 25, 201, 206, 238, 207, 240, 213; 711/137, 140, 163, 132, 145, 213, 204; 714/15, 35, 735, 50, 736, 51, 39; 713/502, 501, 323; 710/267, 200, 262, 243, 266, 49

(56) References Cited

U.S. PATENT DOCUMENTS

| | | | | |
|---|---|---|---|---|
| 4,525,780 A | * | 6/1985 | Bratt et al. | 711/163 |
| 5,687,338 A | * | 11/1997 | Boggs et al. | 712/205 |

\* cited by examiner

*Primary Examiner*—Daniel H. Pan
(74) *Attorney, Agent, or Firm*—Blakely, Sokoloff, Taylor & Zafman LLP

(57) ABSTRACT

The present invention is a method and apparatus to inject an external event to a first pipeline stage in a pipeline chain. A target instruction address corresponding to an instruction is specified. The external event is asserted when there is a match between the target instruction address and a pipeline instruction pointer corresponding to a second pipeline stage. The second pipeline stage is earlier than the first pipeline stage in the pipeline chain. The external event is unmasked via a delivery path between a signal representing the asserted external event and the first pipeline stage.

24 Claims, 3 Drawing Sheets

INJECTION CONTROL MECHANISM FOR EXTERNAL EVENTS

BACKGROUND

1. Field of the Invention

This invention relates to microprocessors. In particular, the invention relates to external event control.

2. Description of Related Art

Delivering an external architectural events in a precise manner is a non-trivial task. The problem is even more compounded for modern microprocessors because of their internal complexities. Modern microprocessors typically have multiple pipeline stages, out-of-order execution, multiple bus fractions for external and internal buses. Generating an external stimulus, or event, to hit a specified instruction boundary in these modern microprocessors is extremely difficult.

The basic problem with injecting external events to the processor is the difficulty in maintaining the synchronism between the external event and the flow of the pipeline. One traditional technique attempts to synchronize the external event with the end of macro (EOM) by introducing no-operation (NOP) micro-operations (micro-ops). This technique requires extensive engineering time for tuning to accommodate different bus speeds. Another technique uses a pounding mechanism to manipulate the valid bit in the re-order buffer (ROB) in order to allow the event to arrive from the pin to the core. However, this technique adds artificial states to the core.

Therefore there is a need in the technology to provide a simple and efficient method to injecting external events to the processor core.

SUMMARY

The present invention is a method and apparatus to inject an external event to a first pipeline stage in a pipeline chain. A target instruction address corresponding to an instruction is specified. The external event is asserted when there is a match between the target instruction address and a pipeline instruction pointer corresponding to a second pipeline stage. The second pipeline stage is earlier than the first pipeline stage in the pipeline chain. The external event is unmasked via a delivery path between a signal representing the asserted external event and the first pipeline stage.

BRIEF DESCRIPTION OF THE DRAWINGS

The features and advantages of the present invention will become apparent from the following detailed description of the present invention in which.

DESCRIPTION

The present invention is a method and apparatus for injecting external events to a processor core. The technique provides a mechanism to inject external events at a specified instruction boundary in a precise and controlled manner.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention.

Figure 1:
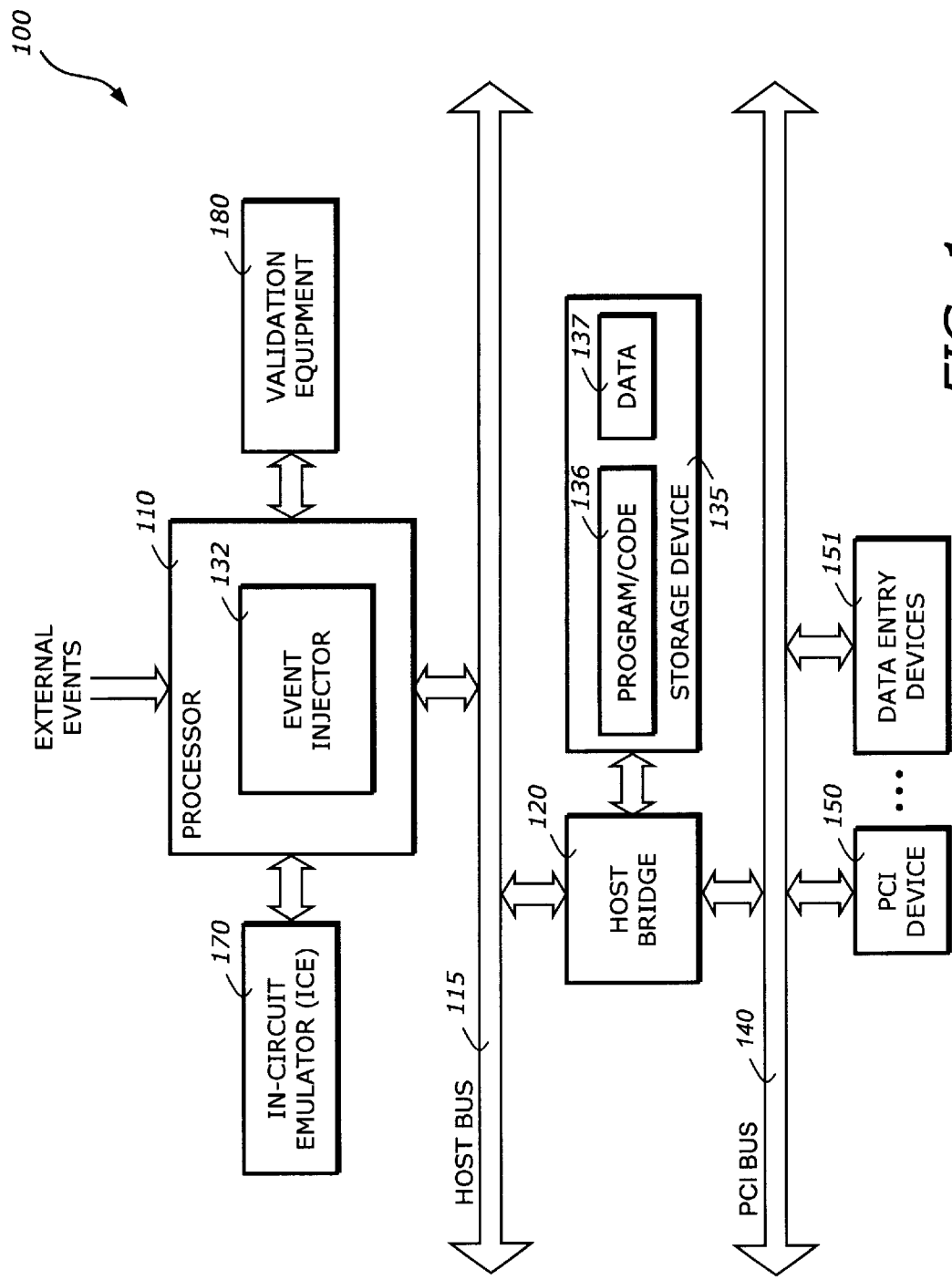
FIG. 1 is a diagram illustrating a system in which one embodiment of the invention can be practiced.

FIG. 1 is a diagram illustrating a system 100 in which one embodiment of the invention can be practiced. The system 100 includes a processor 110, an in-circuit emulator (ICE) 170, a validation equipment 180, a host bus 115, a host bridge 120, a storage device 135, a peripheral component interconnect (PCI) bus 140, a PCI device 150, and data entry devices 151.

The processor 110 represents a central processing unit of any type of architecture, such as complex instruction set computers (CISC), reduced instruction set computers (RISC), very long instruction word (VLIW), or hybrid architecture. In addition, the processor 110 is capable of multiprocessing although this invention can be practiced without the requirement of multiprocessing capabilities. The processor 110 is coupled to the host bridge 120 via the host bus 115. The processor 110 is coupled to the ICE 170 and the validation equipment 180. The processor 110 receives external events at the external event pins. The external events include asynchronous events such as interrupt, reset, initialization, etc. The processor 110 includes an even injector 132 which injects the external events to the processor core.

The ICE 170 is a hardware emulator to emulate the processor 110. The ICE 170 allows a user to test, debug, and emulate the hardware design when the processor is operating in-circuit in a prototype system. By using the event injector 132, the ICE 170 can pin point the external events to a specified instruction boundary, allowing the user to observe the state of the processor at some predefined address.

The validation equipment 180 allows a design engineer to validate the processor 110. The validation process may include procedures to validate or confirm the performance of a macro or micro instruction. By using the event injector 132, the validation engineer can effectively inject a precisely controlled external event into the processor core to verify the operation of the macro or micro instruction.

The host bridge 120 provides an interface between the host bus 115 and a peripheral bus 140 (e.g., PCI bus). The host bridge 120 (e.g., PCI bridge) also provides an interface between the host bus 115 and the storage device 135. The storage device 135 represents one or more mechanisms for storing data. For example, the storage device 135 may include read only memory (ROM), random access memory (RAM), magnetic disk storage mediums, optical storage mediums, flash memory devices, and/or other machine-readable mediums. FIG. 1 also illustrates that the storage device 135 has stored therein data 137 and program 136. Data 137 represents data used by the program 136. Program 136 represents the necessary code for performing any and/or all of the techniques in the present invention. Of course, the storage device 135 preferably contains additional software (not shown), which is not necessary to understanding the invention.

When implemented in software, the elements of the present invention are essentially the code segments to perform the necessary tasks. The program or code segments can be stored in a processor readable medium or transmitted by a computer data-signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Figure 2:
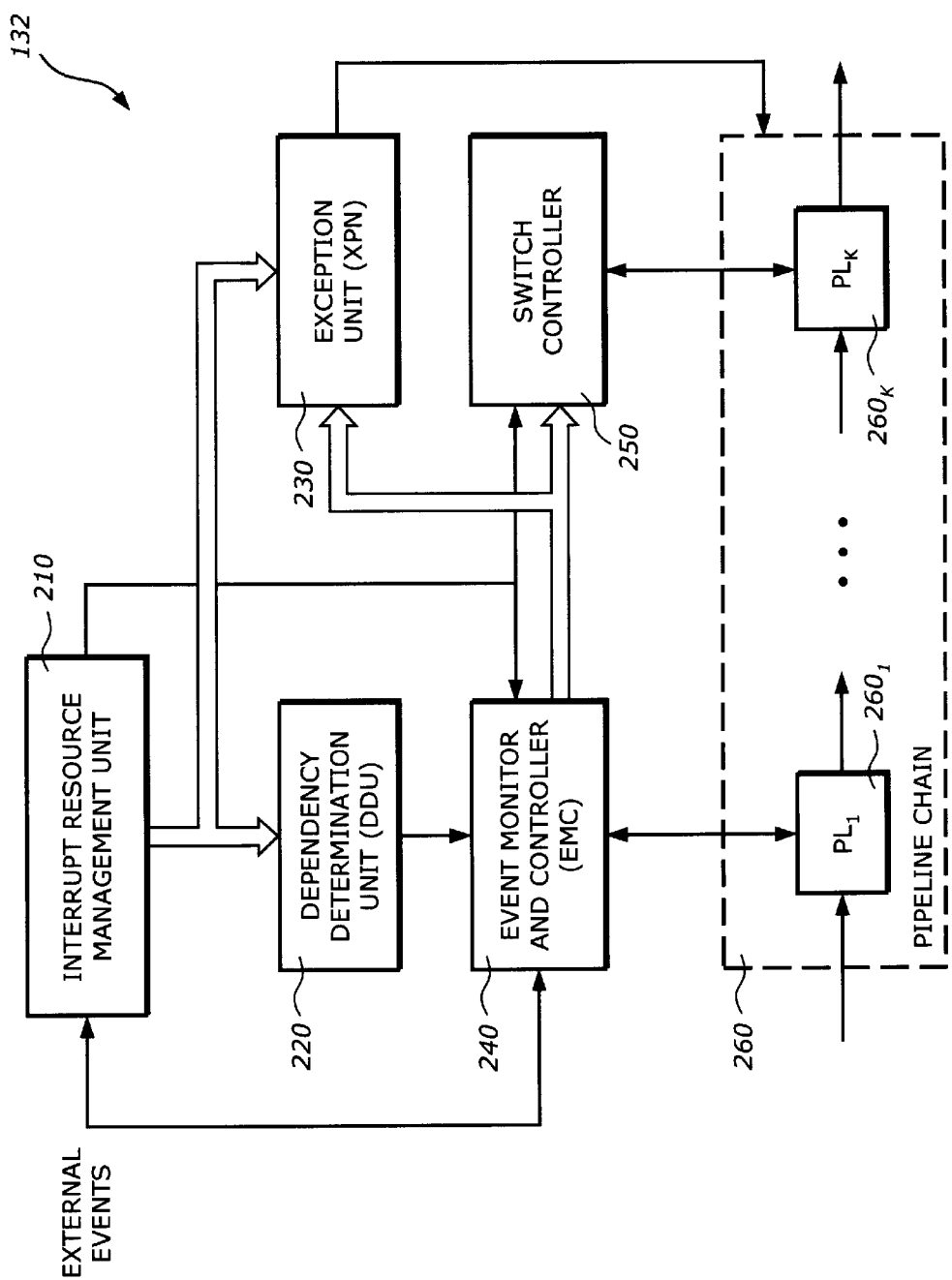
FIG. 2 is a diagram illustrating an event injector for injecting external events according to one embodiment of the invention.

The PCI bus 140 represents an expansion bus that allows the processor 110 to communicate with a number of peripheral devices such as the PCI device 150 and data entry devices 151. Examples of PCI device 150 include mass storage controller, network interface, communication interface, audio and video controller, etc. Examples of data entry devices 151 include keyboard, mouse, table digitizer, etc. FIG. 2 is a diagram illustrating an event injector 132 for injecting external events according to one embodiment of the invention. The event injector 132 includes an interrupt resource management unit (IRMU) 210, a dependency determination unit (DDU) 220, an exception unit (XPN) 230, an event monitor and controller (EMC) 240, a switch controller 250, and a pipeline 260.

The IRMU 210 includes a set of programmable registers that allow the user to set up and/or configure the desired operation. The IRMU 210 interfaces to the external pins designated to receive the external events. These external events include interrupt signals or other test signals. The interrupt signals corresponding to the interrupt pins include the maskable interrupt (INTR), non-maskable interrupt (NMI), initialization (INIT), and platform management interrupt (PMI).

The programmable registers include the user visible pin-point registers that allow the user to specify the external events to be injected to the pipeline 260. The pin-point registers may include a set of bits each corresponding to an external event, referred to as event bits. The user may set an event bit to specify that the corresponding external event will be injected to the pipeline 260. The pin-point registers may also include selection bits to specify some logic combination of the external events. For example, an external event may be defined as an ANDing of a maskable interrupt and the non-maskable interrupt. Any logic functions can be defined including AND, OR, XOR, NOT.

The programmable registers also include a linear address of the instruction pointer (IP) at which the corresponding external event or events are to be injected. It is also possible to specify a number of different linear addresses and the corresponding external conditions involving the external events so that a sequence of injections can be performed.

The IRMU 210 also generates a signal representing the asserted external event at the corresponding external pin to the switch controller 250 via a delivery path to the pipeline 260. The delivery path forms a connection between the external event and the target pipeline stage in the pipeline 260 when it is determined that the external event is to be injected.

The DDU 220 analyzes the instructions to determine the resource dependency, usually the registers. The DDU 220 also performs register re-naming if the dependency can be avoided by re-naming to another available register.

The XPN 230 controls the handling of the exceptions. These exceptions include all faults (e.g., bus fault), traps (e.g., instructions and data breakpoints), and external events (e.g., INTR, NMI). Based on the activity of the processor and the type of exceptions, the XPN 230 makes decision on which exceptions that can be taken at what time. When an exception is taken, the XPN 230 will send a signal to other units to flush the pipeline because an exception typically restarts the pipeline and a new instruction flow is to be executed.

The event monitor and controller (EMC) 240 monitors the flow of the pipeline 260 and generates appropriate control signals. The EMC 240 receives the information about the external events and the corresponding target linear IP as configured or programmed in the IRMU 210. The EMC 240 monitors the linear IP of a predetermined pipeline stage and compares the linear IP with the target linear IP. When there is a match, the EMC 240 asserts the external event signal at the external pin. The EMC 240 masks the delivery path of the external event to the pipeline 260 by generating a switch control signal to the switch controller 250. The EMC 240 also monitors the state of the XPN 230 to determine if the XPN 230 has begun the service of the exception as generated by the IRMU 210 in response to the assertion of the external events by the EMC 240. When this exception, or interrupt, window is open signaling that the XPN 230 has started the exception handling, the EMC 240 unmasks the external event by controlling the switch controller 250 to complete the delivery path.

The switch controller 250 is essentially a controllable delivery path for the external event signal to propagate to the pipeline 260 from the IRMU 210. The switch controller 250 may be implemented as a transistor or any switch having an on/off action that can connect the signal path to the pipeline 260. The switch controller 250 receives a control signal from the EMC 240. When the EMC 240 masks the external event, the switch controller 250 turns off the delivery path, preventing the assertion of the exception signal from the IRMU 210 to the pipeline 260. When the EMC 240 unmasks the external event, the switch controller 250 turns on the delivery path, allowing the exception signal to pass through to the pipeline 260.

The pipeline 260 includes a number of pipeline stages $260_1$ to $260_K$ in the pipeline chain of the processor core. The pipeline stage $260_1$ represents an early pipeline stage to synchronize the injection of the external event at the precise instruction boundary. The pipeline stage $260_1$ is a safe stage in that the event is not posted too early to avoid the flushing due to miss predicted branch. In one embodiment, the pipeline stage $260_1$ is selected to be after the Branch Target Buffer (BTB) stage. The pipeline stage $260_K$ corresponds to the stage that the external event is to be injected. In one embodiment, the pipeline stage $260_K$ is selected at the architectural level because some modern processors only deliver events to at the architectural level, which allows external events to be taken.

The pipeline stages $260_1$ and $260_K$ are selected such that the time for the micro-operation (uOp) to propagate from the pipeline stage $260_1$ to the pipeline stage $260_K$ is at least equal to or greater than the time for the specified external event(s) to propagate from the external pin(s) to the processor core where they are sampled. This will ensure that the external event(s) arrive synchronously with the specified instruction boundary, or the linear IP. To automate the hold time for posting the events on the pins, the EMC 240 monitors or inquires the signals from the IRMU 210. The IRMU 210 acknowledges the assertion of the external events and then releases the holding of the external pins. This avoids the problem of indeterminate processing time caused by bus fractions problem, or different bus operating frequencies.

Figure 3:
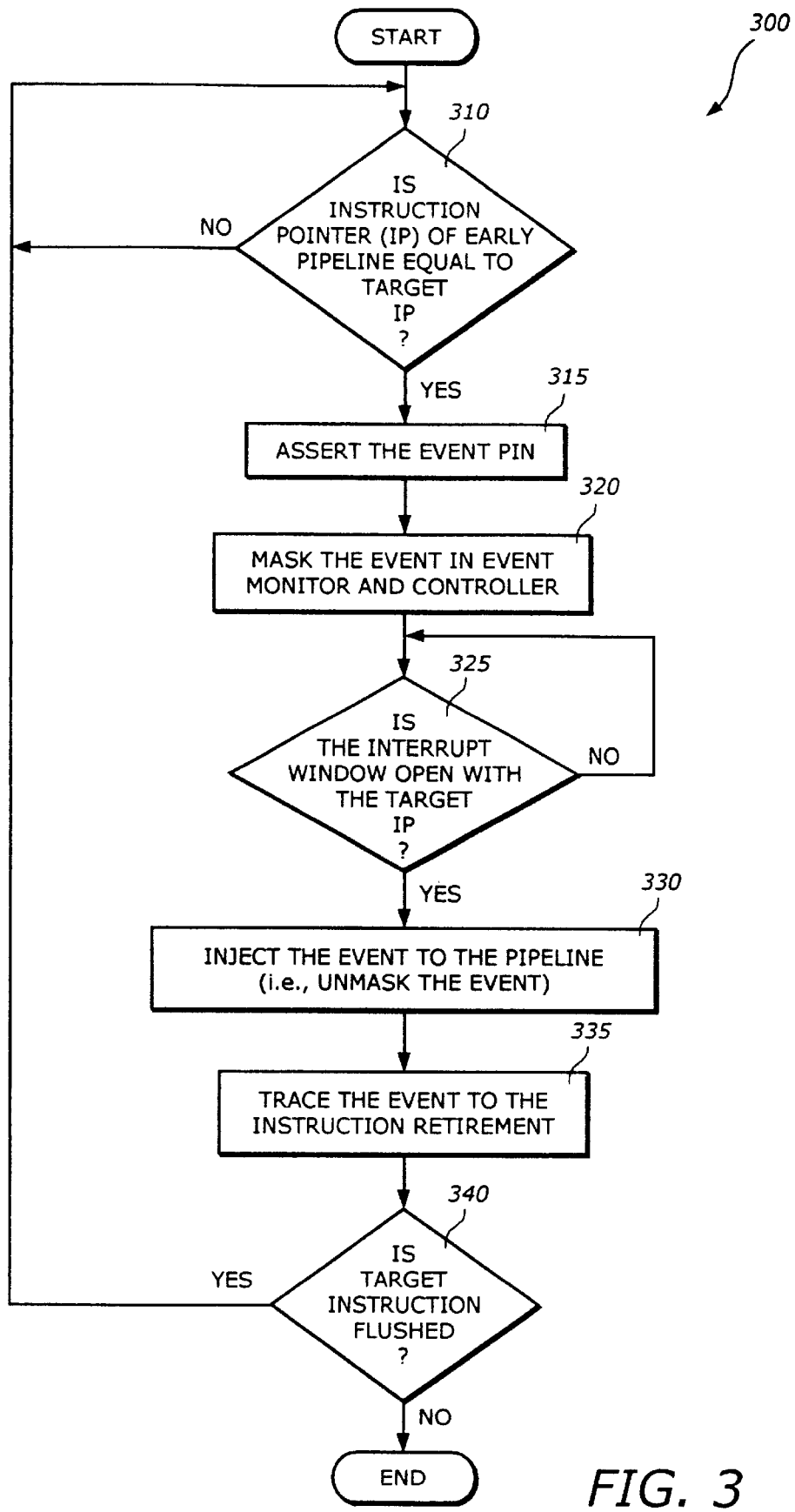
FIG. 3 is a flowchart illustrating a process to inject external events according to one embodiment of the invention.

FIG. 3 is a flowchart illustrating a process 300 to inject external events according to one embodiment of the invention.

Upon START, the process 300 determines if the instruction pointer (IP) of the early pipeline stage is equal to the target IP as specified by the user (Block 310). The specific pipeline stage is determined based on the pipeline delay and the processing time of the event monitor and controller. If it is not equal, the process 300 returns back to block 310 to continue to monitor the address. If it is equal, the process 300 asserts the event signal at the corresponding event pin (Block 315). Then the process 300 masks the event in the event monitor and controler (Block 320). Masking here implies that the event is not allowed to propagate down to the pipeline.

Then, the process 300 determines if the interrupt window is open (Block 325). An open interrupt window signifies that the external event has been recognized by the processor. If the interrupt window is not open, the process 300 returns to block 325 to wait until the interrupt window is open. If the interrupt window is open, the process 300 injects the event to the pipeline, i.e., the event monitor and controller unmasks the event and allows the event to propagate to the pipeline at the target instruction boundary (Block 330). Then the process 300 traces the event to the instruction retirement (Block 335).

Next, the process 300 determines if the target instruction has been flushed (Block 340). If the target instruction has been flushed, the process 300 returns back to block 310 to continue monitor the address. If the target instruction has not been flushed, the process 300 is terminated.

Thus, the present invention is a technique to inject external events to the processor core in the pipeline stage. The technique provides a mechanism that inject the external events in a precise manner. Several applications utilizing the technique include software debugging, in-circuit emulation (ICE) development, and design validation. The technique is independent of the bus clock speed and therefore can be used in any processor architecture. Design engineers can utilize the technique to trace and fix hardware bugs because the technique can pinpoint to any end of macro (EOM) and deliver external events, allowing patching out macro- and micro-instructions.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method to inject an external event to a first pipeline stage in a pipeline chain, the method comprising:
   specifying a target instruction address corresponding to an instruction;
   asserting the external event by an event monitor and controller when there is a match between the target instruction address and a pipeline instruction pointer corresponding to a second pipeline stage, the second pipeline stage being earlier than the first pipeline stage in the pipeline chain; and
   unmasking the external event via a delivery path between a signal representing the asserted external event and the first pipeline stage.

2. The method of claim 1 further comprising:
   masking the external event after the external event is asserted;
   tracing the instruction through the pipeline chain until the instruction is retired; and
   if the instruction is flushed, repeating asserting the external event when there is a match between the target instruction address and the pipeline instruction pointer.

3. The method of claim 2 wherein masking comprises:
   decoupling the signal from the first pipeline stage in the delivery path.

4. The method of claim 1 wherein unmasking comprises:
   determining if the asserted external event is handled by an exception unit; and
   coupling the signal to the first pipeline stage in the delivery path.

5. The method of claim 1 wherein the external event is one of an interrupt, a reset, and an initialization.

6. An apparatus to inject an external event to a first pipeline stage in a pipeline chain, the apparatus comprising:
   a resource management unit coupled to receive the external event, the resource management unit containing a target instruction address corresponding to an instruction;
   an event monitor and controller coupled to the resource management unit to assert the external event when there is a match between the target instruction address and a pipeline instruction pointer corresponding to a second pipeline stage, the second pipeline stage being earlier than the first pipeline stage in the pipeline chain; and
   a switch controller coupled to the event monitor and controller to unmask the external event via a delivery path between a signal representing the asserted external event and the first pipeline stage.

7. The apparatus of claim 6 wherein the event monitor and controller masks the external event after the external event is asserted.

8. The apparatus of claim 7 wherein the event monitor and controller traces the instruction through the pipeline chain until the instruction is retired.

9. The apparatus of claim 8 wherein, if the instruction is flushed, the event monitor and controller repeats asserting the external event when there is a match between the target instruction address and the pipeline instruction pointer.

10. The apparatus of claim 7 wherein the event monitor and controller controls the switch controller to decouple the signal from the first pipeline stage in the delivery path.

11. The apparatus of claim 6 wherein the switch controller couples the signal to the first pipeline stage in the delivery path when an exception unit responds to the asserted external event.

12. The apparatus of claim 6 wherein the external event is one of an interrupt, a reset, and an initialization.

13. A system comprising:
   a pipeline chain having first and second pipeline stages, the second pipeline stage being earlier than the first pipeline stage;
   an exception unit coupled to the pipeline chain to handle an exception caused by an external event; and
   an event injector coupled to the pipeline chain to inject an external event to the first pipeline stage in the pipeline chain, the event injector comprising:
      a resource management unit coupled to receive the external event, the resource management unit containing a target instruction address corresponding to an instruction,
      an event monitor and controller coupled to the resource management unit to assert the external event when there is a match between the target instruction address and a pipeline instruction pointer corresponding to the second pipeline stage, and a switch controller coupled to the event monitor and controller to unmask the external event via a delivery path between a signal representing the asserted external event and the first pipeline stage.

14. The system of claim 13 wherein the event monitor and controller masks the external event after the external event is asserted.

15. The system of claim 14 wherein the event monitor and controller traces the instruction through the pipeline chain until the instruction is retired.

16. The system of claim 15 wherein, if the instruction is flushed, the event monitor and controller repeats asserting the external event when there is a match between the target instruction address and the pipeline instruction pointer.

17. The system of claim 14 wherein the event monitor and controller controls the switch controller to decouple the signal from the first pipeline stage in the delivery path.

18. The system of claim 13 wherein the switch controller couples the signal to the first pipeline stage in the delivery path when the exception unit responds to the asserted external event.

19. The system of claim 13 wherein the external event is one of an interrupt, a reset, and an initialization.

20. A computer program product comprising:

a computer usable medium having computer program code embodied therein to inject an external event to a first pipeline stage in a pipeline chain, the computer program product having:

computer readable program code for specifying a target instruction address corresponding to an instruction;

computer readable program code for asserting the external event by an event monitor and controller when there is a match between the target instruction address and a pipeline instruction pointer corresponding to a second pipeline stage, the second pipeline stage being earlier than the first pipeline stage in the pipeline chain; and computer readable program code for unmasking the external event via a delivery path between a signal representing the asserted external event and the first pipeline stage.

21. The computer program product of claim 20 further comprising:

computer readable program code for masking the external event after the external event is asserted;

computer readable program code for tracing the instruction through the pipeline chain until the instruction is retired; and computer readable program code for repeating asserting the external event when there is a match between the target instruction address and the pipeline instruction pointer if the instruction is flushed.

22. The computer program product of claim 21 wherein the computer readable program code for masking comprises:

computer readable program code for decoupling the signal from first pipeline stage in the delivery path.

23. The computer program product of claim 20 wherein the computer readable program code for unmasking comprises:

computer readable program code for determining the asserted external event is handled by an exception unit; and computer readable program code for coupling the signal to the first pipeline stage in the delivery path.

24. The computer program product of claim 20 wherein the external event is one of an interrupt, a reset, and an initialization.

* * * * *